United States Patent
Henskes (10) Patent No.: US 12,484,572 B2
(45) Date of Patent: Dec. 2, 2025

(54) MODULAR BIRD DISPERSAL SYSTEM

(71) Applicant: Bird Control Group B.V., Delft (NL)

(72) Inventor: Steinar Finn Boye Henskes, Delft (NL)

(73) Assignee: BIRD CONTROL GROUP B.V., Delft (NL)

( * ) Notice: Subject to any disclaimer, the term of this patent is extended or adjusted under 35 U.S.C. 154(b) by 932 days.

(21) Appl. No.: 17/603,983

(22) PCT Filed: Apr. 15, 2020

(86) PCT No.: PCT/NL2020/050250
§ 371 (c)(1),
(2) Date: Oct. 15, 2021

(87) PCT Pub. No.: WO2020/214029
PCT Pub. Date: Oct. 22, 2020

(65) Prior Publication Data
US 2022/0202005 A1 Jun. 30, 2022

(30) Foreign Application Priority Data
Apr. 16, 2019 (NL) .................................... 2022956

(51) Int. Cl.
*A01M 29/10* (2011.01)
(52) U.S. Cl.
CPC .................................... *A01M 29/10* (2013.01)
(58) Field of Classification Search
CPC ....... A01M 29/10; A01M 29/32; A01M 29/26
See application file for complete search history.

(56) References Cited

U.S. PATENT DOCUMENTS

| | | | |
|---|---|---|---|
| 6,575,597 B1 * | 6/2003 | Cramer | F41A 33/02 116/22 A |
| 6,793,364 B2 * | 9/2004 | Cramer | F41A 33/02 362/112 |
| 6,802,654 B1 | 10/2004 | Roberts et al. | |

(Continued)

FOREIGN PATENT DOCUMENTS

KR 10-1373698 B1 3/2014

OTHER PUBLICATIONS

International Patent Application No. PCT/NL2020/050250; Int'l Written Opinion and Search Report; dated Jul. 13, 2020; 9 pages.

*Primary Examiner* — Quan Zhen Wang
*Assistant Examiner* — Rajsheed O Black-Childress
(74) *Attorney, Agent, or Firm* — BakerHostetler (57) ABSTRACT

The present disclosure concerns a modular bird dispersal system, comprising: a photonic beam module having a light source to generate an output beam, the photonic beam module further comprising a control unit for controlling the light source. The system further comprising a receiving module having a physical connector, for reversibly connecting to a matching counterpart connector on the photonic beam module, wherein the physical connector and matching counterpart connector are arranged to, when connected: align the photonic beam module within a pre-defined position; electrically connect a plurality of spaced connection pads with matching connection pins to form electrical connection between the photonic beam module and receiving module; and at least partly dissipate heat generated by the light source to the receiving module.

13 Claims, 3 Drawing Sheets

(56) References Cited

U.S. PATENT DOCUMENTS

| | | | | |
|---|---|---|---|---|
| 8,635,035 | B2* | 1/2014 | De Oto | H05B 45/58 |
| | | | | 315/120 |
| 11,241,006 | B2* | 2/2022 | Henkes | A01M 29/10 |
| 2007/0273509 | A1* | 11/2007 | Gananathan | H05B 47/19 |
| | | | | 340/540 |
| 2011/0144829 | A1 | 6/2011 | Kim et al. | |
| 2012/0017845 | A1* | 1/2012 | Scott | A01M 29/10 |
| | | | | 362/157 |
| 2015/0262491 | A1* | 9/2015 | Seelamonthula | G08G 5/0026 |
| | | | | 340/953 |
| 2018/0325096 | A1* | 11/2018 | Tillotson | B64D 45/00 |
| 2018/0352803 | A1 | 12/2018 | Hamel et al. | |
| 2020/0359616 | A1* | 11/2020 | Henkes | A01M 29/10 |

\* cited by examiner

MODULAR BIRD DISPERSAL SYSTEM

CROSS-REFERENCE TO RELATED APPLICATIONS

This application is the National Stage of International Patent Application No. PCT/NL2020/050250, filed Apr. 15, 2020, which claims priority from Netherlands Patent Application No. NL 2022956 filed Apr. 16, 2019, the entire contents of both of which applications are incorporated herein by reference.

TECHNICAL FIELD AND BACKGROUND

The present invention relates to devices for deterring birds from an area to be protected in particular, for preventing birds to hinder air traffic or to consume gardens fields or crops. More specifically, the present invention relates to optical bird dispersal systems with improved safety and/or serviceability.

Preventing collisions between birds and aircraft poses major challenges for airports. To combat this problem, various techniques are proposed to disperse birds from certain controlled areas at or near airfields. These include the use of distress calls, bangs, mirrors and or beams. Laser beams may be used by bird control staff using a manual operated laser torch but also using a system which automatically moves a laser beam in certain area. Similar laser beams may be used to disperse pests, e.g. birds, from other areas including garden and/or agricultural areas. The use of laser beams can be effective, but also introduces a new risk related to laser safety. For example poor control over laser positioning may lead to a risk of illuminating undesired areas, e.g. areas close to people, risking dazzling or blinding of e.g. persons and sensors.

US20110144829 describes a known system for deterring animals with a motorized light source driver. In view of safety, proper alignment between the driver and light source is important. Small misalignments may, in view of long projection distances, lead to larges deviations at the projection location. Commonly, the lifetime of the light source limits the useful operational time of optical systems, e.g. optical bird dispersal systems. When replacing the light source service is required to assure proper alignment and/or calibration. Servicing of known systems by an operator is prone to alignment and/or other user errors reducing operation safety. Alternatively, servicing at location by a specialized maintenance engineer or at a servicing location incurs additional costs and/or system downtime. Additionally, in the known system a possible service failure, e.g. due to diminished or failing light sources, cannot be estimated effectively, diminishing opportunities for timely planned maintenance procedures. Furthermore, the known device, is unable to directly resume normal operation after being temporarily halted by an emergency trigger event, e.g. by a manual or operator induced emergency stop signal.

The present invention aims to mitigate one or more of the above problems. Accordingly, the present invention relates to a photonic bird. dispersal system with improved serviceability and operational safety.

SUMMARY

The present disclosure provides an improved bird deterrence system by providing a modular bird dispersal system comprising a photonic beam module and a corresponding receiving module.

Aspects of the present disclosure relate to a modular bird dispersal system. The modular bird dispersal system comprises a photonic beam module having a light source generate an output beam. The photonic beam module further comprising a control unit for controlling the light source. Controlling includes, but is not limited to, switching the beam from an off state to an on state and vice versa. Controlling may further include regulating a beam intensity, e.g. by controlling the power supply to the light source. The modular bird dispersal system further comprises a receiving module for reversibly connecting to the photonic beam module. The receiving module comprises a physical connector, for reversibly connecting to a matching counterpart connector on the photonic beam module. The physical connector and matching counterpart connector are arranged to, when connected, align the photonic beam module within a pre-defined position. In particular, to assure that the photonic beam module is oriented in pre-defined position with respect to the receiving module. By orienting the photonic beam module in a pre-defined position the orientation of an output beam, e.g. a light beam, may be controlled, e.g. by controlling the receiving module. By controlling the orientation of an output beam exposures at unexpected or unwanted angles, positions, and/or locations may be avoided. The physical connector and matching counterpart connector are preferably further arranged to form an electrical connection between the photonic beam module and the receiving module, i.e. close an electrically conducting circuit. Preferably, the electrical connection is formed over a plurality of spaced connection pads matching connection pins. The pads and pins may be part of the physical connector but may also be separate to it—as long as an electrical connection is provided. With pins and pads, it is indicated that this is a generic structure for making electrical contact through a mechanical connection, typically with male (pins) and female (pads) connections. The connection pads may be provided to the physical connector and the connection pins may be provided to the matching counterpart connector. Conversely, the pins may be provided to the physical connector and the pads to the matching counterpart connector. It will be appreciated, that alternatively or in addition, the matching connectors may be provided with a mixture of pads and pins or other electrically conductive connection means to form an electrical connection between the photonic beam module and the receiving module. Preferably photonic beam module is not provided with a power source to power the light source. By forming the electrical connection the photonic beam module and light source may receive power via the receiving module. Preferably, the electrical connection is formed in conjunction with the alignment of the light source. In other words, preferably the electrical connection between photonic beam module and receiving module is dependent on the alignment between the modules. By forming the electrical connection over the physical connector and matching counterpart connector electrical connection and physical alignment are interrelated, which contributes to improving operational safety of the light source and/or the modular bird dispersal system as a whole. For example, if e.g. during operation the connection between physical connector and matching counterpart connector breaks and/or if alignment is lost, the electrical connection will be disconnected which results in a deactivation of the light source. The physical connector and matching counterpart connector are preferably further arranged to, when connected, at least partly dissipate heat generated by the light source to the receiving module. The receiving module may be further arranged to dissipate said heat to ambient. Dissipating at least part, preferably a substantial part, of the heat generated in the photonic beam module, e.g. by the light source, may contribute to cooling the light source. Reducing an operating temperature of the photonic beam module, e.g. light source, may improve the operational characteristics of the light source, e.g. output beam intensity, quality and/or continuity. Further, reducing an operating temperature may improve the life-time of the light source, particularly for a laser light source.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1A:
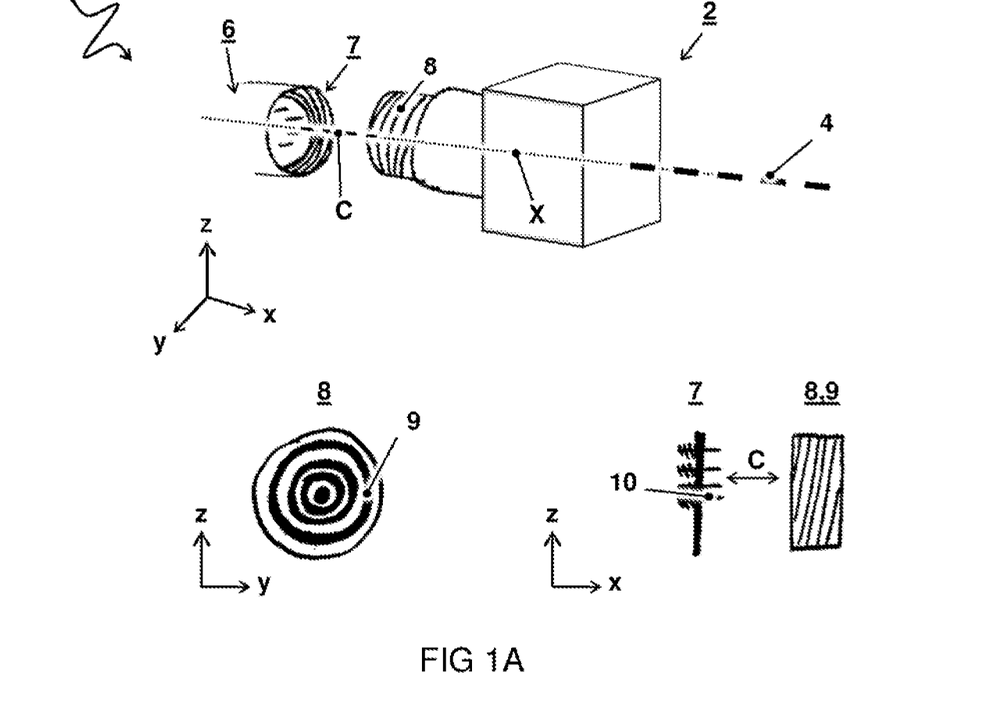
FIG. 1A provides schematic perspective and side views of a photonic beam module and part of receiving module of a modular bird dispersal system.

FIG. 1A (top) depicts a schematic perspective view of a tubular shaped photonic beam module 2 and part of a receiving module 6 comprised in a modular bird dispersal system 1. The photonic beam module 2 produces an optical output beam 4. Said output beam 4 may contribute to deterring pests, e.g. birds, from a pre-defined target area. During operation the output beam 4 is over, e.g. scanned, along a pre-defined trajectory, e.g. using a motorized driver (not shown) provided in the receiving module 6. The photonic beam module 2 is provided with (visible in FIG. 1B) a light source 3, and a control unit 5. The receiving module 6 and light photonic beam module 2 are connectable by provided physical connector 7 and matching counterpart connector 8, each preferably provided on respective end portions of the modules. When connected an electrical connection C, indicated by a dashed line, is formed the modules 2, 6, over a plurality of adjacent connection pads 9 and matching connection pins 10.

In a preferred embodiment, e.g. as shown in FIG. 1A (bottom left), the matching counterpart connector 8 is provided with a series of concentric connection pads. In another or further preferred embodiment, the physical connector 7 is provided with a plurality of connection pins 10. It will be appreciated that the dimension and distance between pads and pins is chosen such that they are mutually matching to, when connected, form an electrical connection C between a pad and a corresponding pin. Preferably, the matching counterpart connector 8 is provided along an optical axis X of the photonic beam module 2. In other words, the physical connector 7 and matching counterpart connector 8 are preferably provided along a projection direction of the output beam 4. By providing the connection pads 9 and connection pins 10 concentrically around an optical axis X of the photonic beam module 2, the output beam 4 will be directed (aligned) relative to the receiving module 6 independent of a relative angular position of the photonic beam module 2 around the optical axis X. By providing the connection pads 9 and connection pins 10 concentrically around an optical axis X of the photonic beam module 2, the electrical connection C may be formed independent of a relative angular position between the connectors.

In another or further preferred embodiment, e.g. a shown in FIG. 1A (bottom right), the physical connector 7 is provided with spring-loading connection pins 10.

Figure 1B:
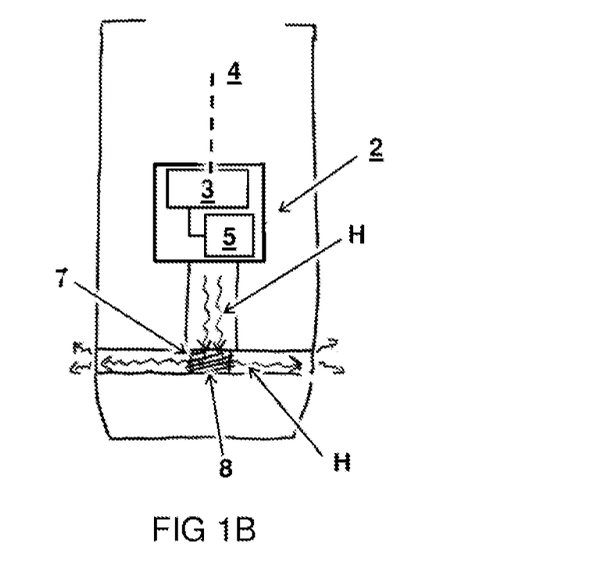
FIG. 1B provides a schematic cross sectional side view of a photonic beam module connected to a receiving module of a modular bird dispersal system.

The physical connector and matching counterpart connector 7, 8 are preferably further arranged to, when connected, at least partly dissipate heat generated by the light source to the receiving module. FIG. 1B provides schematic cross sectional side view of a photonic beam module 2 connected to a receiving module 6 by physical connector 7 and matching counterpart connector 8. In the embodiment of the modular bird dispersal system, e.g. as shown, heat H (indicated by wavy lines) generated by the light source 3 dissipates from the photonic beam module 2 to the thermal mass provided by the receiving module 6 that is in thermally conductive contact with the light source 3 via the matching connectors. From there the heat preferably dissipates to ambient, e.g. via an external surface of the receiving module 6. It will be appreciated that the physical connector 7, matching counterpart connector 8, and thermal mass are dimensioned to effectively transport heat from the photonic beam module 2. It will be appreciated that, the connectors 7, 8 and thermal mass are dimensioned to cool the light source 3 to an appropriate operating temperature. In embodiments wherein the photonic beam module 2 includes a laser light source, the operation temperature of the laser light source is preferably maintained a range between ambient and 75° C., e.g. 70° C., preferably in a range between 65° C. and ambient, e.g. 60° C. or lower such as 50° C. Ambient temperatures may be understood to be in a range between 5 and 25° C. In embodiments wherein the light source 3 includes a diode laser light source, e.g. a diode laser with a nominal output power of 500 mW the connectors 7, 8, and the thermal mass may be arranged to dissipate thermal heat from the laser. An exemplary diode laser specified to have an optical output of 500 mW has a nominal power consumption of about 10 W. To facilitate heat dissipation from the light source, the physical connector 7, the matching counterpart connector 8, and thermal mass are formed of materials with a good thermal conductivity to have a combined thermal conductivity in excess of $1\ W \cdot m^{-1} \cdot K^{-1}$. Preferably, the thermal conductivity is higher, e.g. in a range between 10 and about 400 $W \cdot m^{-1} \cdot K^{-1}$. Suitable materials include but are not limited to metals such as aluminum, steel, and copper. By using materials with a higher thermal conductivity more heat can be dissipated from the light source 3 to ambient. It will be further appreciated that the connectors 7, 8, and thermal mass are preferably, suitably dimensioned. In some embodiments, the contact area between the matching connectors, i.e. the interface area over which heat may be transferred from the light source 3 to the receiving module 6, may be dimensioned with an area in a range between 5 and 100 cm2, e.g. 10 cm2 or 20 cm2. For example, the connectors may be tubular shaped with a diameter in a range between 1 and 5 cm, e.g. about 2 cm and to have a contact area over a minimum length of about 1 cm. The thermal mass is preferably also suitably dimensioned to direct an inward heat-flow from the light source 3 to ambient, either directly or via a suitable further cooling body such as a radiator. In some embodiments, the thermal mass may have an area towards ambient in excess of 100 $cm^2$, preferably in excess of 200 cm2, or even more such as in excess of 500. An upper limit may be very large, e.g. up to 10000 cm2 or even more such as 50000 cm2, particularly if the thermal mass is provided with additional cooling surface such as radiator fins.

Figure 2A:
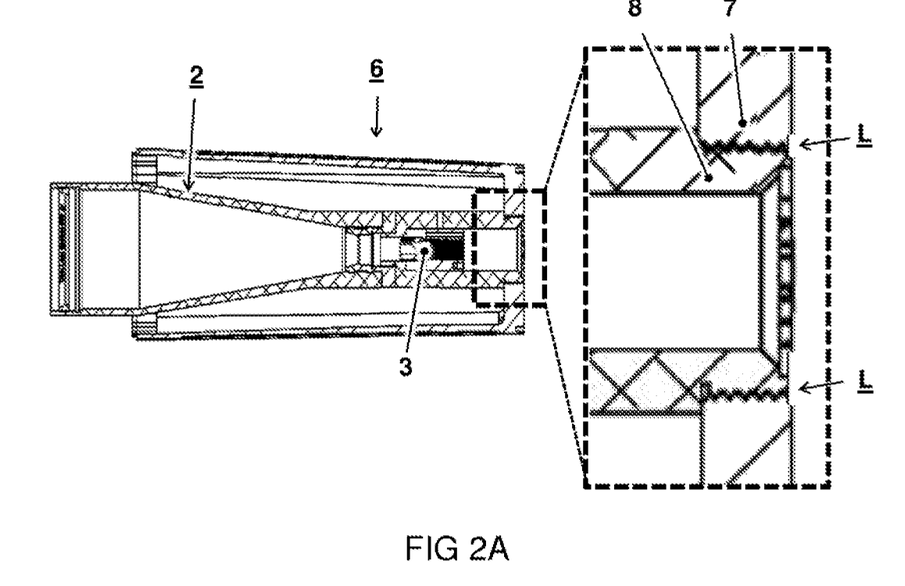
FIG. 2A provides a schematic cross sectional side view and detail view of a photonic beam module connected to a receiving module of a modular bird dispersal system.

In some preferred embodiments, e.g. as in FIG. 2A the physical connector 7 and matching counterpart connector 8 are arranged to form an interlocking connection L. In the embodiment as shown a photonic beam module 2 comprising a light source 3 is connected to a receiving module 6. The physical connector 7 and matching counterpart connector 8 are provide with matching screw-thread L. Screw-thread connections may be particularly suitable to form reversibly connect the modules. Using an interlocking connection L, e.g. screw-thread, allows reversibly connecting the modules. Using an interlocking connection L, e.g. screw-thread, limits, when connected relative movement between, the photonic beam module 2 and the control unit 5 which allows connecting the modules in a predictable, pre-defined relative alignment. Using an interlocking connection L, e.g. screw-thread, further forms a physical contact area over which heat may flow between the modules, e.g. heat conduction from the photonic beam module 2 to the receiving module 6. Using an interlocking connection L as shown, e.g. screw-thread, may be particularly beneficial in combination the concentric connection pads 9 and connection pins 10. Upon rotating the modules into contact an electrical connection C is only formed after providing relative angular alignment between the modules. In other words, the electrical connection C is only formed upon completing a minimum insertion distance, e.g. after at least 3 windings and/or after an insertion distance of 1 cm. Conversely, upon removal of the photonic beam module 2 the electrical connection C will be broken before the physical connection, e.g. alignment, between the modules is lost. It will be appreciated that alternative interlocking connections benefiting from the advantages above may be applied as well. Suitable alternatives include, but are not limited to bayonet type connections.

Figure 2B:
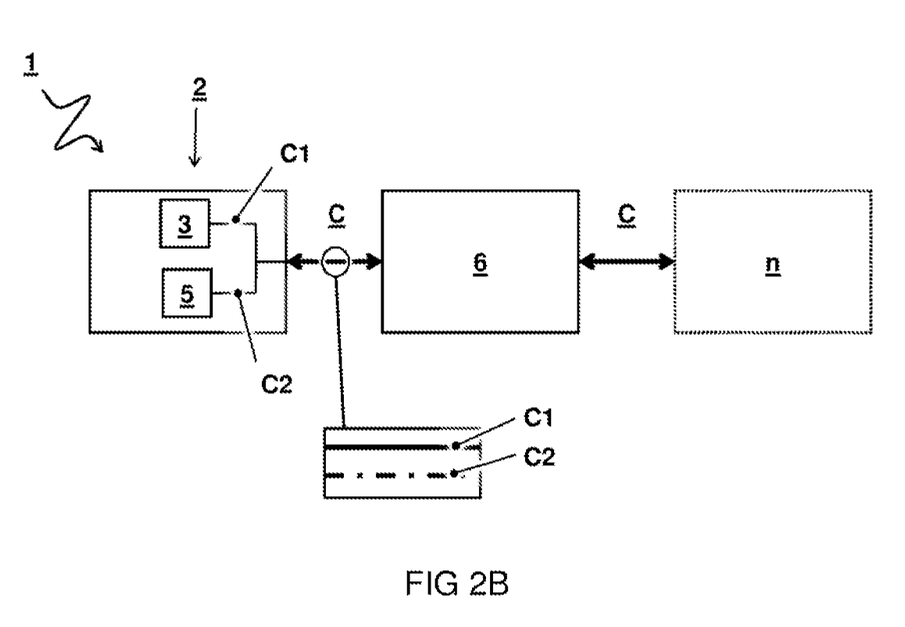
FIG. 2B provides a schematic view of the electrical connection between modules of a modular bird dispersal system.

FIG. 2B provides a schematic view of the electrical connection C between the photonic beam module 2 with a control unit 5 and receiving module 6 of a modular bird dispersal system 1. In some preferred embodiments, e.g. as shown, the electrical connection C comprises at. least two separate electrical circuits C1, C1. The first circuit C1 to power the light source 3 and a second circuit C2 for data communication between the control unit 5 and the receiving module 6. By using an electrical. connection C comprising at least two separate electrical circuits as identified above allows the system to independently power the light source 3 and the control unit 5. Preferably, such a split power connection is maintained throughout additional modules "n", preferably all, modules, comprised in the modular bird dispersal system 1. Additional modules comprised in the modular bird dispersal system 1 may include a power module, a main controller module, a motorized pan-and-tilt module (PTU), and an emergency stop module. It will be appreciated that not all modules need be included in the system. Alternatively or in addition multiple modules may be combined, e.g. two modules may be combined in a single unit. For, example a main controller module may be combined with a PTU module. Use of a split power design contributes to operational safety of the system. Advantages of using a split power design include a possibility for a controlled shutdown in emergency situations. For example, upon triggering an emergency stop the light source 3 may be powered down whereas the control unit 5, and further modules comprised in the modular bird dispersal system 1, may continue running during so these can for example continue reporting a status of the system. Additionally, during an emergency stop the control unit 5 and other modules remain powered such that, upon restarting, the system does not start up in an unknown state. In other words, since the microcontrollers may remain enabled during emergency stop they can control the startup of the system when power is restored and make sure the system does not boot into an unknown state. Further, electronic diagnosing of the modular bird dispersal system 1 remains possible, since communications and control of the microcontrollers remains available in emergency mode. This makes it possible to read information from the separate modules of the system while having the light source 3 disabled making it possible to perform error diagnosis.

It will be appreciated that the electrical connection C may comprise further circuitry such as a dedicated communication bus. This communication channel may form a further separate electrical connection. Alternatively the communication channel may understood to be part of the second circuit C2. It will be further appreciated that other modules (indicated with box with a dashed border) such as a PTU unit may benefit from the described electrical connection C in a similar way. For example the microcontrollers in the PTU unit may be power (or un-powered) independently from the motor in the PTU unit.

Figure 3A:
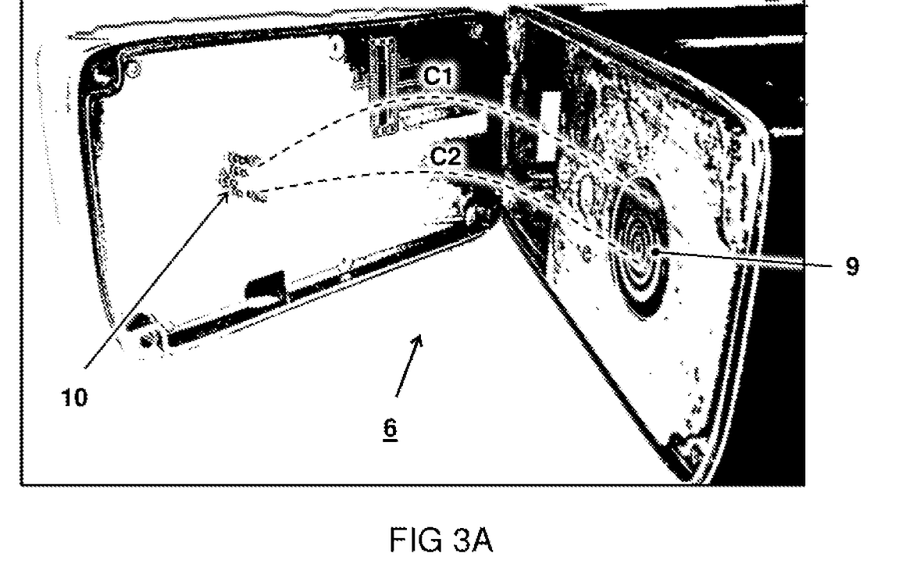
FIG. 3A provides of photograph of a photonic beam module connected to a receiving module.

FIG. 3A provides of photograph of a receiving module 6 connected to photonic beam module 2 (not visible). The receiving module 6 formed of hingedly connected parts. For clarity reasons the receiving module 6 is shown in an opened position revealing the concentric connection pads 9 of a connected photonic beam module 2 (not visible, view blocked by right part of the receiving module) and connection pins 10 over which, when closed, electrical connections C1 and C2 are formed (indicated by dashed lines).

In some embodiments, e.g. as shown, the physical connector and matching counterpart connector are arranged to, upon connecting, close the second C2 before the first circuit C1 and wherein upon disconnecting the first circuit C1 is opened before the second circuit C2. Said feature may be achieved by providing connection pins 10 for the respective circuits with differing length. Preferably, the connection pin for closing the first circuit C1 is shorter. It will be appreciated that alternate embodiments achieving the same effect, e.g. staggered connection pads 9, are also envisioned. Closing the second circuit C2 before the first circuit upon connecting the photonic beam module 2 and receiving module 6 and conversely, upon disconnecting, disconnecting the first circuit C1 the second circuit C2 contributes to improving the operational safety to the system, for example if during servicing events the connector malfunctions, or if the modules somehow become misaligned.

In another or further preferred embodiment, first circuit C1 and second circuit C2 are comprised in a bus architecture, preferably in a linear bus topology, connecting a plurality, preferably all, of the modules comprised in the modular bird dispersal system 1. The bus architecture preferably comprises at least a main power rail formed by the first circuit C1 for powering actuation components. Actuation components may be understood to include the light source 3 and a motor, e.g. in the PTU module. The bus architecture preferably further comprises a constant power rail formed by the second circuit C2. The constant power rail powers the control circuitry in the modules, including microcontrollers and sensory systems. The constant power rail (second circuit) preferably further comprises a communication circuit.

In some preferred embodiments, the modular bird dispersal system is further provided with one or more sensing means, e.g. a sensing module, connected to the second circuit C2 for measuring a life time parameter of the light source 3. Preferred sensing means include a counter for counting operating hours, e.g. cumulative operating hours, of the light source 3. By counting the operating hours, preferably cumulative operating hours remaining life-time of the light source 3 may be estimated. Optionally or in addition the sensing means may be arranged to track a number of switching events, e.g. on/off events, of the light source. Counting the number of switching, e.g. cumulative switching, may contribute to estimating the remaining lifetime of the light source 3. It will be appreciated that described sensing means (not shown in Figures), including a counter for counting operating hours and a counter arranged to track a number of switching events, e.g. on/off events, of the light source, may be provided in any of the modules comprised in the modular bird dispersal system 1. Alternatively, described sensing means may be included in a separate sensor module (depicted in FIG. 3B). By providing the sensing means in a separate sensor module, sensors may be serviced, add and/or replaced separately, e.g. without disrupting system operation.

In other or further preferred embodiments, the photonic beam module 2 is provided with an output sensor for measuring the output power of the output beam 4. In one embodiment, e.g. wherein the laser module comprises a laser light source, the photonic beam module 2 is arranged to control the power output of the laser beam. In the photonic beam module 2, a portion of the output the light source 3, e.g. laser source, is split off from the output beam 4, e.g. by a semi-transparent mirror, and directed towards a light intensity sensor. The remainder of the output the light source 3 source is exiting the photonic beam module 2 for bird repelling. In such embodiment, output power of the photonic beam module 2 can be fed in a feedback control mechanism, e.g. a feedback loop, to control its power output. By measuring the output power, settings of the light source 3. e.g. feed power, may be adjusted to correct the output power to a desired of specified output level. Preferably, calibration needs to be performed to relate the power output of the bird repelling laser beam to the light intensity sensor values.

Further, preferred sensing means include a temperature sensor for measuring a temperature of the light source and/or temperature of the light intensity sensor. By tracking the temperature, preferably temperature history, of the light source 3, may contribute to estimating the remaining lifetime of the light source 3. By measuring the temperature of the light source 3 the operating conditions, e.g. feed power, may be adjusted to prevent heating of the light source 3 outside a pre-defined temperature range. Inventors further found that the output signal of the light intensity sensor may be temperature dependent. The temperature of the light intensity sensor may be used as a further input parameter in the feedback loop to improve control over the output power of the output beam 4. By connecting the sensor to an independent second circuit C2 the sensors and microcontroller may remain active, even during times wherein actuation components of the system such as the light source 3 are switched off. By measuring operational parameters, including the temperature of the light source 3 and/or the temperature of the light intensity sensor, the system may be switched to an off-state from an off-state with accurate control over the output power of the output beam 4. In other or further embodiments of the modular bird dispersal system the control unit 5 is arranged to use output data from the sensing means to control an output power of the output beam 4, e.g. by controlling an input power to the light source 3.

In other or further embodiments the modular bird dispersal system is, further provided with a non-volatile storage medium (not shown in figures) for storing one or more of: data relating to an input power of the light source 3 and the output data of the one or more sensing means. Said data may be read out externally by an operator and/or service engineer and may contribute to serviceability of the modular bird dispersal system 1. Particularly, in combination with the electrical connection C as described herein, the data may be read out when the system is in an error or malfunction state.

In another or further preferred embodiment the light source is a laser light source, preferably a diode laser. It will be appreciated that the advantages as described herein of a modular bird dispersal system 1 including a physical connector 7, such as output beam 4 alignment are particularly advantageous for systems operating with intensity light beams, such as laser beams.

In a preferred embodiment, the modular bird dispersal system 1, further comprising an emergency module 13, wherein the emergency module 13 is at least arranged to trigger a command to open the first electrical circuit C1 for removing power to the light source 3 of the photonic beam module 2, while allowing the second circuit (C2) and to remain operational. Preferably, the emergency module 13 is further arranged to, e.g. upon removal of an emergency condition, restore the power connection, i.e. close the first circuit C1.

Figure 3B:
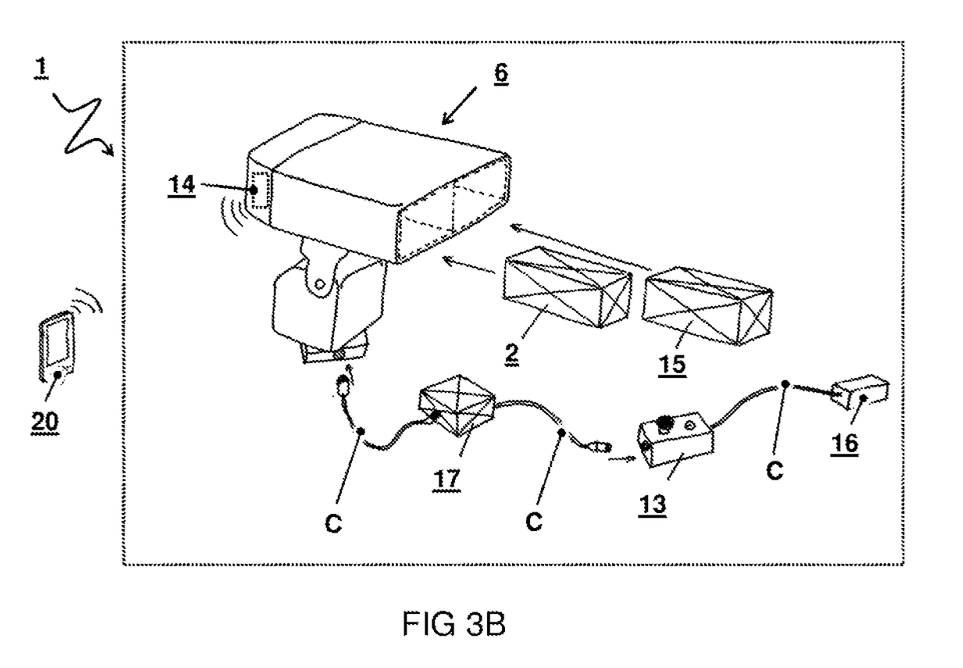
FIG. 3B provides a schematic view of a nodular bird dispersal system.

FIG. 3B provides a schematic view of an embodiment of the modular bird dispersal system 1 according to the invention comprising a radar module 15 and a photonic beam module 2 connectable over the physical connector 7 (not shown) to a receiving module 6. The receiving module is combined in a housing with PTU functionality and a main controller module 14. Connected to the receiving module 6 over the electrical connection C are a sensor module 17, an emergency module 13 and a power module 16. It will be appreciated that the present invention also relates to the modular bird dispersal system comprising benefitting from the advantages describe herein. In particular modules describe herein may be combined in alternate ways to form systems comprising more of less modules. For example, a portable beam system, e.g. a hand-held light source, may be formed by connecting a photonic beam module 2 over the physical connector 7 to a receiving module 6 including a main controller module 14 and a power module 16.

In some embodiments, the modular bird dispersal system the modules, preferably at least the main controller module and photonic beam module, are arranged to communicate over the electrical connection C using a communication protocol, preferably including a cyclic redundancy check (CRC). By including a main controller module, all communication between modules may be controlled from a single unit. An operator may interface with a single unit to control all modules in the system. Hereby, the main controller module 14 may function as a master, controlling communication between the other modules in the system. Via the main controller module 14 instructions, including operational conditions and/or address labels may be directed to the modules. Operating instructions may be understood to include power of the output beam 4, motion setting of the PTU module may be controlled from a single unit. Conversely, modules may also communicate, e.g. send operations status parameters, including sensor readings, to the main controller module 14. By implementing the address label in the communication between modules instructions, e.g. from the main controller module 14, to various other modules may be addressed to a specific module. Modules may be arranged to not execute instructions if address conditions are not met. For example, a 'power-off' command may be directed over a single communication circuit, e.g. the second circuit C2, to a specific module, e.g. a radar module, via a plurality of other modules. By including a CRC check, execution of corrupted or distorted messages may be prevented. Optionally or additionally, one or more modules, preferably at least the main controller module 14, may be provided with wireless communication means for communication with an external (i.e. not physically connected) module 20, e.g. a hand held operator control module.

In other or further embodiments, the modular bird dispersal system 1 is arranged to use a communication protocol including a heart beat signal. By using a communication protocol that includes a heart beat signal actuator components, e.g. the light source 3 and/or PTU unit, may be configured to deactivate upon interruption of the heart heat signal. By including a heart beat signal into the communication, loss of communication may be set as a trigger for deactivating actuation components of the system thereby improving the operational safety of the system. For example, the photonic beam module 2 may be configured to deactivate the light source 3 upon loss of the heart beat signal. Alternatively, preferably additionally, the main controller module 14 may be configured to interrupt the first circuit C1 upon interruption of the heart beat signal. In a preferred embodiment, the heart beat signal formed of a query-response type communication, preferably having a frequency of at least 0.5 Hz, e.g. a frequency in a range between 0.5 Hz and 10 kHz, e.g. 1.0 Hz or 1 kHz, preferably in a range between 1 Hz and 1 kHz, e.g. 5 Hz, 50 Hz, 60 Hz or 500 Hz, most preferably in a range between 5 Hz and 10 Hz.

For the purpose of clarity and a concise description, features are described herein as part of the same or separate embodiments, however, it will be appreciated that the scope of the invention may include embodiments having combinations of all or some of the features described. For example, while embodiments were shown for embodiment of the modular bird dispersal system 1, also alternative ways may be envisaged by those skilled in the art having the benefit of the present disclosure for achieving a similar function and result. E.g. modules may be combined or split up into one or more alternative components. The various elements of the embodiments as discussed and shown offer certain advantages, such as predictable alignment and separate electrical connection, circuits. Of course, it is to be appreciated that any one of the above embodiments or processes may be combined with one or more other embodiments or processes to provide even further improvements in finding and matching designs and advantages. It is appreciated that this disclosure offers particular advantages to laser light sources, and in general can be applied benefitting from the added safety benefits provided by using the present invention.

In interpreting the appended claims, it should be understood, that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A modular bird dispersal system (1), comprising:
a photonic beam module (2) having a light source (3) to generate an output beam (4), the photonic beam module (2) further comprising a control unit (5) for controlling the light source;
a receiving module (6) having a physical connector (7) for reversibly connecting to a matching counterpart connector (8) on the photonic beam module,
wherein the physical connector (7) and the matching counterpart connector (8) are arranged to, when connected:
align the photonic beam module (2) within a predefined position;
electrically connect a plurality of spaced connection pads (9) with matching connection pins (10) to form an electrical connection (C) between the photonic beam module (2) and the receiving module (6); and
at least partly dissipate heat (H) to a thermal mass provided in the physical connector (7), and
wherein the electrical connection (C) between the photonic beam module (2) and the receiving module (6) is dependent upon alignment between the photonic beam module (2) and the receiving module (6), such that the electrical connection (C) is formed by the physical connector (7) and the matching counterpart connector (8) closing at least one electrical circuit.

2. The modular bird dispersal system (1) according to claim 1, wherein the at least one electrical circuit comprises a first circuit (C1) to power the light source (3) and a second circuit (C2), separated from the first circuit (C1), for data communication between the control unit (5) and the receiving module (6).

3. The modular bird dispersal system (1) according to claim 1, wherein the light source (3) is a laser light source.

4. The modular bird dispersal system (1) according to claim 2, wherein the physical connector (7) and matching counterpart connector (8) are arranged to, upon connecting, close the second circuit (C2) before the first circuit (C1) and wherein upon disconnecting the first circuit (C1) is opened before the second circuit (C2).

5. The modular bird dispersal system (1) according to claim 2, wherein the first circuit (C1) and second circuit (C2) are comprised in a bus architecture having a linear bus topology that connects at least a plurality of the modules comprised in the modular bird dispersal system.

6. The modular bird dispersal system (1) according to claim 2, further comprising one or more sensing means connected to the second circuit (C2) for measuring a life time parameter of the light source (3).

7. The modular bird dispersal system (1) according to claim 6, further comprising a non-volatile storage medium (12) for storing one or more of:
an input power of the light source (3) and output data of the one or more sensing means.

8. The modular bird dispersal system (1) according to claim 2, wherein the photonic beam module (2) comprises an output sensor connected to the second circuit (C2) for measuring an output power of the output beam (4).

9. The modular bird dispersal system (1) according to claim 2, wherein the photonic beam module (2) comprises a temperature sensor connected to the second circuit (C2) for measuring a temperature of the light source (3).

10. The modular bird dispersal system (1) according to claim 2, wherein the photonic beam module (2) comprises at least one of:
an output sensor connected to the second circuit (C2) for measuring an output power of the output beam (4); and
a temperature sensor connected to the second circuit (C2) for measuring a temperature of the light source (3);
wherein the control unit (5) is arranged to use output data from the output sensor and/or temperature sensor to control the output power of the output beam (4).

11. The modular bird dispersal system (1) according to claim 2, further comprising an emergency module (13), wherein the emergency module (13) is at least arranged to trigger a command to open the first circuit (C1) for removing power to the light source (3) of the photonic beam module (2), while allowing the second circuit (C2) to remain operational.

12. The modular bird dispersal system (1) according to claim 2, further comprising a main controller module (14), wherein at least the main controller module (14) and the photonic beam module (2) are arranged to communicate over the electrical connection (C).

13. The modular bird dispersal system (1) according to claim 12, wherein at least the main controller module (14) and photonic beam module (2) are further arranged to use a communication protocol including a heart beat signal, wherein the photonic beam module (2) deactivates the light source (3) upon interruption of the heart beat signal and wherein the main controller module (14) interrupts the first circuit (C1) upon interruption of the heart beat signal.

\* \* \* \* \*